(12) United States Patent
Yanakiev et al.

(10) Patent No.: US 9,028,365 B2
(45) Date of Patent: May 12, 2015

(54) METHOD OF SHIFTING A TRANSMISSION

(71) Applicant: Ford Global Technologies, LLC, Dearborn, MI (US)

(72) Inventors: Diana Yanakiev, Birmingham, MI (US); Vladimir Ivanovic, Dearborn, MI (US); Bradley Dean Riedle, Northville, MI (US); Eric Hongtei Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 13/800,475

(22) Filed: Mar. 13, 2013

(65) Prior Publication Data
US 2014/0274559 A1 Sep. 18, 2014

(51) Int. Cl.
*B60W 10/02* (2006.01)
*B60W 10/11* (2012.01)
*B60W 10/04* (2006.01)

(52) U.S. Cl.
CPC ........... *B60W 10/11* (2013.01); *Y10T 477/6418* (2015.01); *B60W 10/02* (2013.01); *B60W 10/04* (2013.01)

(58) Field of Classification Search
CPC .............. B60K 41/00; B60K 2702/18; B60K 2741/02; F16H 61/0267; F16H 61/0206; F16H 61/0437; F16H 61/061; F16H 61/08; F16H 61/143; F16H 47/08; F16H 2061/0444
See application file for complete search history.

(56) References Cited

U.S. PATENT DOCUMENTS

| | | | |
|---|---|---|---|
| 6,508,742 B2 * | 1/2003 | Popp et al. ..................... | 477/155 |
| 6,577,939 B1 | 6/2003 | Keyse et al. | |
| 6,832,976 B2 * | 12/2004 | Nishida et al. ................ | 477/120 |
| 7,115,069 B2 | 10/2006 | Soliman et al. | |
| 7,212,898 B2 | 5/2007 | Whitton et | |
| 7,549,946 B2 | 6/2009 | Ayabe et al. | |
| 7,559,875 B2 | 7/2009 | Steinhauser et al. | |
| 7,717,821 B2 | 5/2010 | Steinhauser et al. | |
| 7,867,137 B2 * | 1/2011 | Steinhauser et al. .......... | 477/115 |
| 7,892,144 B2 | 2/2011 | Steinhauser et al. | |
| 7,983,824 B2 | 7/2011 | Steinhauser et al. | |
| 2007/0129211 A1 * | 6/2007 | Steinhauser et al. .......... | 477/102 |
| 2007/0287591 A1 * | 12/2007 | Steinhauser et al. .......... | 477/121 |
| 2012/0290163 A1 * | 11/2012 | Inagaki et al. .................. | 701/22 |

* cited by examiner

*Primary Examiner* — Justin Holmes
(74) *Attorney, Agent, or Firm* — James Dottavio; Brooks Kushman P.C.

(57) ABSTRACT

A method of controlling a multiple step downshift is disclosed. Two offgoing shift elements are released and two oncoming shift elements are engaged to complete the downshift. During a first phase of the downshift, one of the offgoing shift elements controls the rate of increase of input shaft speed. During a second phase of the downshift, one of the oncoming shift elements controls the rate of increase of the input shaft speed. The method computes target torque capacities such that output torque and input shaft acceleration are continuous during the transition between phases. Furthermore, the method computes target torque capacities such that both oncoming clutches reach zero relative speed simultaneously as the input shaft reaches the final speed ratio.

20 Claims, 4 Drawing Sheets

METHOD OF SHIFTING A TRANSMISSION

TECHNICAL FIELD

This disclosure relates to the field of automatic transmissions for motor vehicles. More particularly, the disclosure pertains to method of changing among speed ratios.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

When driving conditions change, an automatic transmission changes from one speed ratio to another speed ratio. For example, when a vehicle is cruising using a low speed ratio and a driver demands an increase in wheel torque, the transmission must downshift into a higher speed ratio. For sudden changes in driver demanded wheel torque, the transmission may skip over one or more available gear ratios in a single shift event. Many automatic transmissions have multiple clutches and select particular speed ratios by engaging particular subsets of the clutches. To perform a shift from one speed ratio to another, one or more previously engaged clutches are released and one or more previously disengaged clutches are engaged. Passenger comfort is improved if fluctuations in wheel torque are minimized and if positive wheel torque is maintained throughout the shift.

SUMMARY OF THE DISCLOSURE

A method of controlling a multiple step downshift includes releasing two offgoing shift element and engaging two oncoming shift elements. The torque capacities of these shift elements is controlled such that the output torque remains positive and dips below the initial output torque only once.

During a first phase of the downshift, the torque capacity of a first offgoing shift element is modulated to control the input shaft speed. During a second phase of the downshift, the torque capacity of a first oncoming shift element is modulated to control input shaft speed. The second phase begins when the relative rotation across the first oncoming shift element changes direction. The method may be used for shifts in which the torque transmitted by the second offgoing shift element would reverse direction if that shift element is not released early in the second phase. At the transition between the first and second phase, a controller may calculate the target torque capacities for the first offgoing shift element and the first oncoming shift element such that the output torque and input shaft acceleration are continuous. During the second phase, a controller may calculate a torque capacity profile for the first oncoming clutch such that both oncoming clutches reach synchronous speed simultaneously. In some embodiments, two holding shift elements may be maintained in a fully engaged state throughout the downshift.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
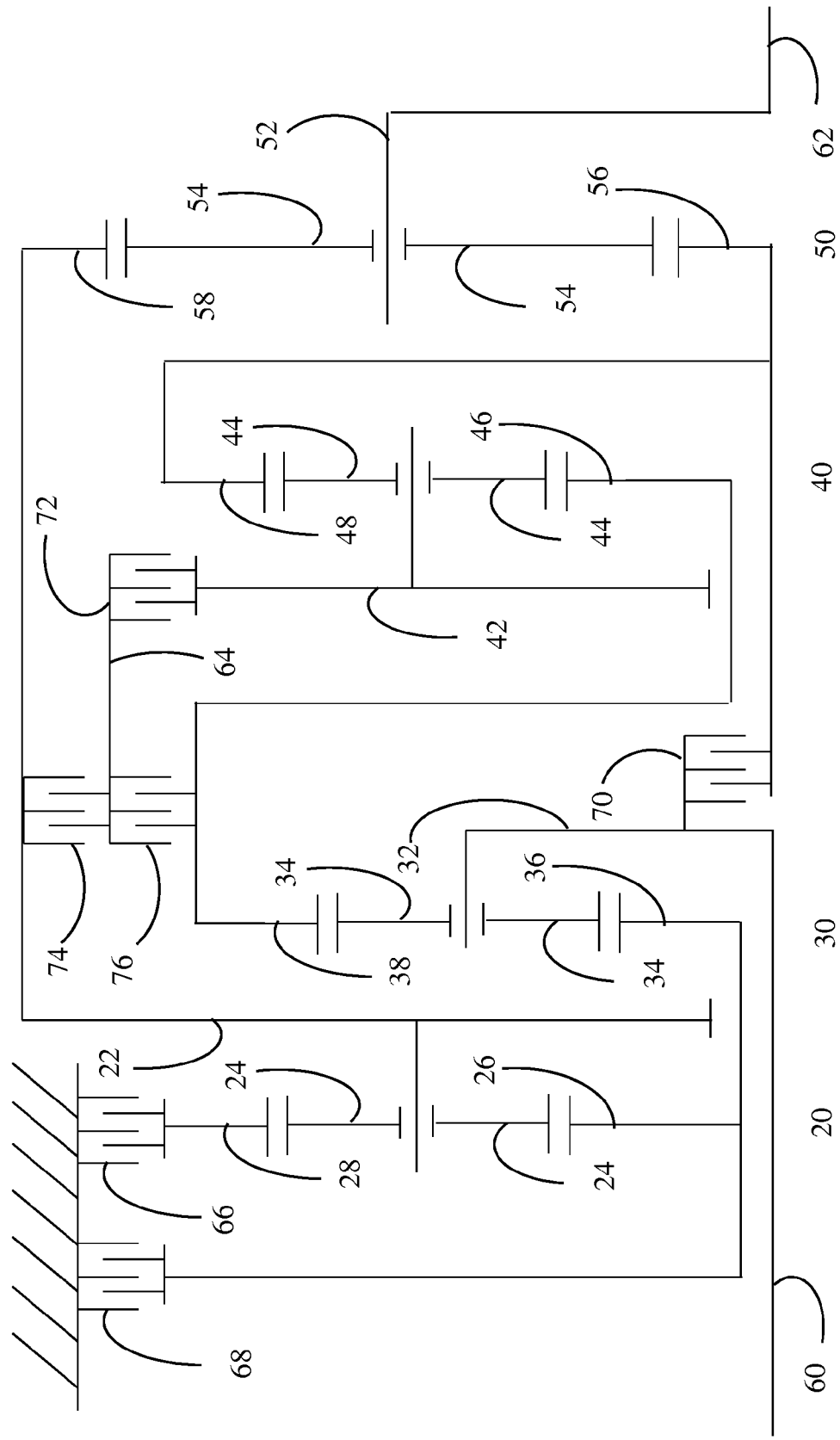
FIG. 1 is a schematic diagram of an exemplary transmission gearing arrangement.

An example transmission is schematically illustrated in FIG. 1. The transmission utilizes four simple planetary gear sets 20, 30, 40, and 50. Sun gear 26 is fixed to sun gear 36, carrier 22 is fixed to ring gear 58, ring gear 38 is fixed to sun gear 46, ring gear 48 is fixed to sun gear 56, input shaft 60 is fixed to carrier 32, and output shaft 62 is fixed to carrier 52. Ring gear 28 is selectively held against rotation by brake 66 and sun gears 26 and 36 are selectively held against rotation by brake 68. Input shaft 60 is selectively coupled to ring gear 48 and sun gear 56 by clutch 70. Intermediate shaft 64 is selectively coupled to carrier 42 by clutch 72, selectively coupled to carrier 22 and ring gear 58 by clutch 74, and selectively coupled to ring gear 38 and sun gear 46 by clutch 76.

As shown in Table 1, engaging the clutches and brakes in combinations of four establishes ten forward speed ratios and one reverse speed ratio between input shaft 60 and output shaft 62. An X indicates that the corresponding clutch is engaged to establish the speed ratio.

TABLE 1

|  | 66 | 68 | 70 | 72 | 74 | 76 | Ratio | Step |
|---|---|---|---|---|---|---|---|---|
| Rev | X | X |  | X | X |  | −4.79 | 102% |
| 1st | X | X | X | X |  |  | 4.70 |  |
| 2nd | X | X |  | X |  | X | 2.99 | 1.57 |
| 3rd | X |  | X | X |  | X | 2.18 | 1.37 |
| 4th | X |  |  | X | X | X | 1.80 | 1.21 |
| 5th | X |  | X |  | X | X | 1.54 | 1.17 |
| 6th | X |  |  | X | X | X | 1.29 | 1.19 |
| 7th |  |  | X | X | X | X | 1.00 | 1.29 |
| 8th |  | X | X | X | X |  | 0.85 | 1.17 |
| 9th |  | X | X |  | X | X | 0.69 | 1.24 |
| 10th |  | X |  | X | X | X | 0.64 | 1.08 |

All single step and two step shifts are performed by gradually engaging one shift element, called an oncoming element (ONC) while gradually releasing a different shift element, called the offgoing element (OFG). During each of these shifts, three shift element, called holding elements, are maintained fully engaged while one element is maintained fully disengaged. In other transmission arrangements, the number of holding elements may be different.

During a downshift, the engine speed must increase to match the new speed ratio. The output torque may decrease while some of the power is diverted to increasing engine speed rather than being transmitted to the output. Also, since shift elements are slipping during a shift, some of the power is converted to heat, exacerbating the output torque deficiency.

Sometimes, it is desirable to downshift by more than two ratio steps. For example, if the vehicle driver presses the accelerator pedal to pass another vehicle while cruising on the highway in top gear, the shift scheduling algorithm may demand a multiple step downshift. For some multiple step downshifts, two shift elements must be releases and two shift elements must be engaged. For example, to shift from 10th gear in the example transmission to 6th gear in the example transmission, brake 68 (OFG1) and clutch 76 (OFG2) must be released and clutch 70 (ONC1) and brake 66 (ONC2) must be engaged. While it is possible to complete such a shift in two stages, by shifting temporarily into 8th gear for example, completing the shift in that manner would result in the output shaft torque dropping twice. Fluctuating output torque tends to be annoying to the driver as it translates directly into fluctuating vehicle acceleration. Also, if the output torque drops to zero or a very low level at any point during the shift, the direction of torque in parts of the driveline can briefly reverse causing noises and additional jerkiness due to gears backlash.

Figure 2:
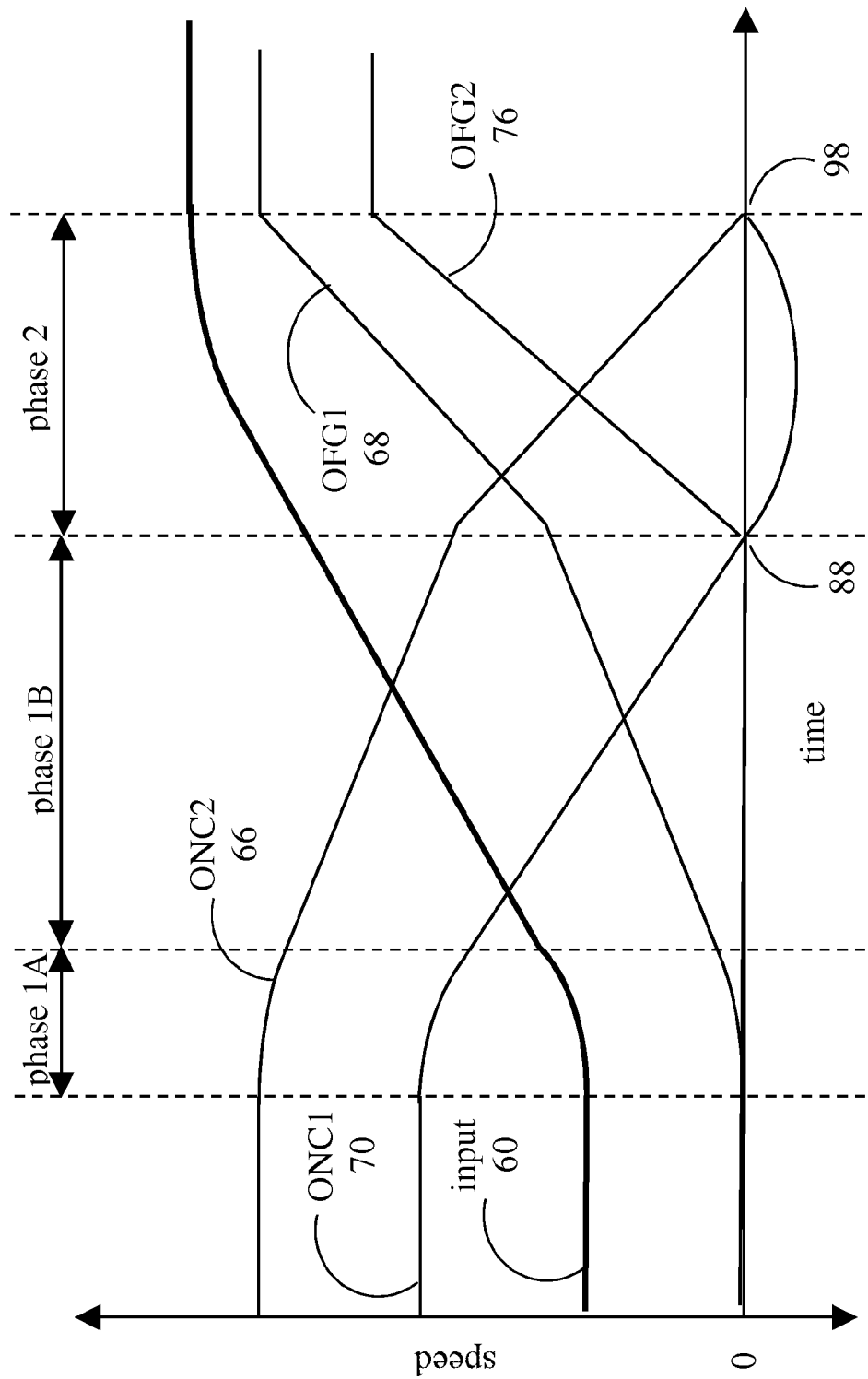
FIG. 2 is a graph illustrating speed relationships during execution of a downshift.
Figure 3:
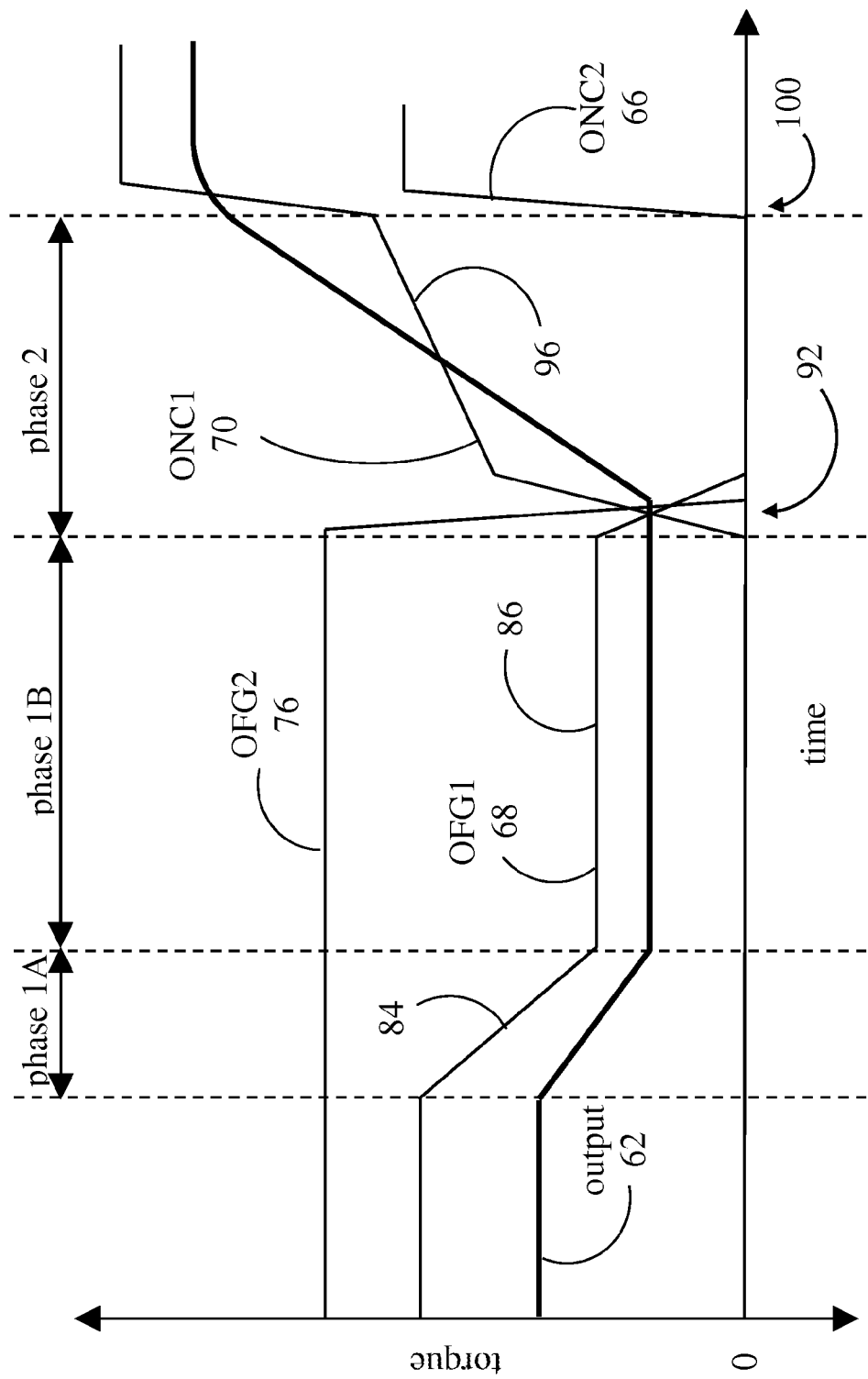
FIG. 3 is a graph illustrating torque relationships during execution of a downshift.
Figure 4:
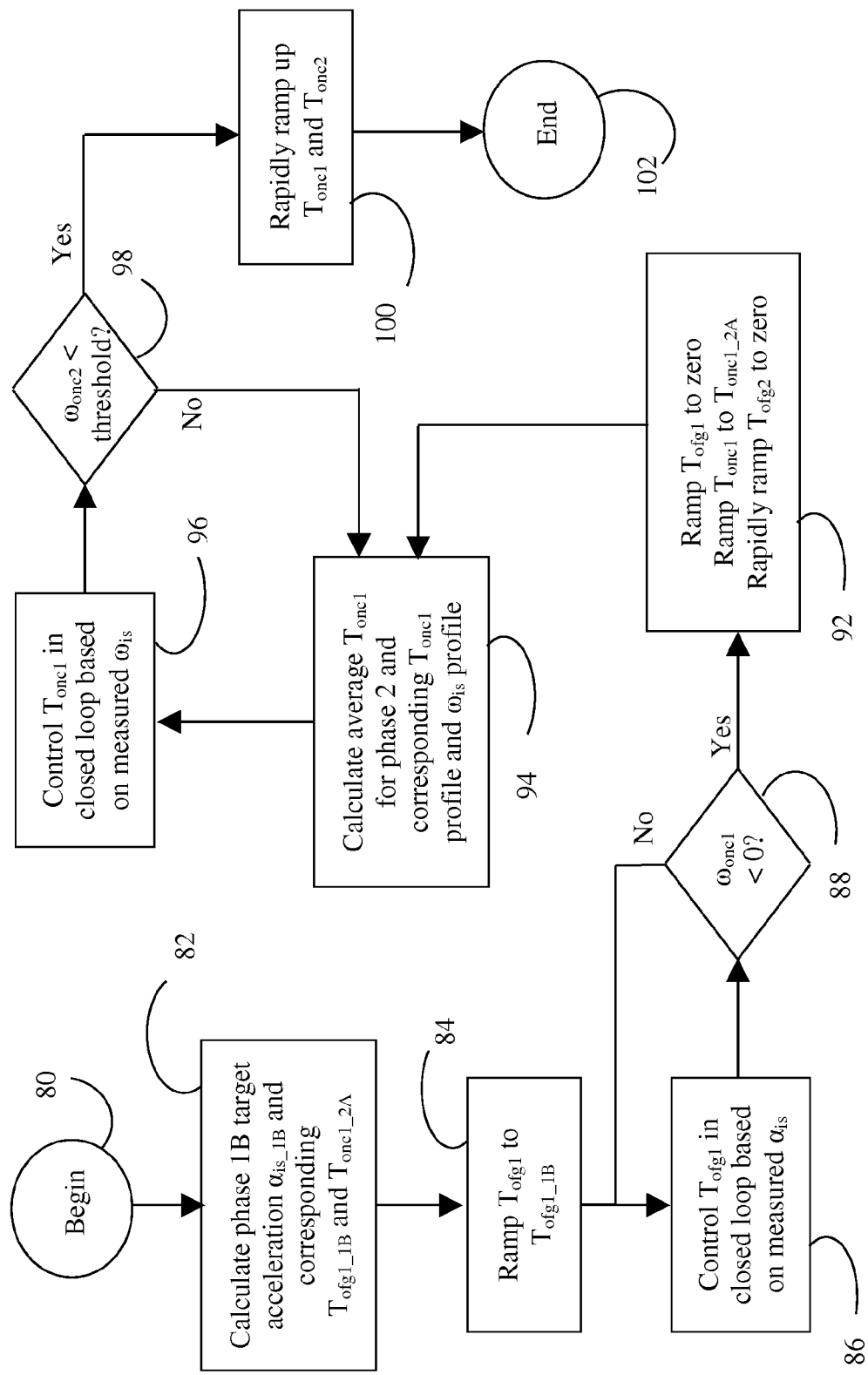
FIG. 4 is a flowchart illustrating a method of shifting.

FIGS. 2 and 3 illustrate speed and torque relationships for a shift from 10th gear to 6th gear in the transmission of FIG. 1. Line 60 in FIG. 2 shows the input speed as a function of time assuming that output speed is substantially constant. The remaining lines depict the relative speeds across various clutches and brakes. The scale is not necessarily identical among lines. Line 62 in FIG. 3 shows the output torque as a function of time assuming that input torque is substantially constant. The remaining lines depict the torque transmitted by various clutches and brakes. Again, the scale is not necessarily identical among these lines. FIG. 4 is a flow diagram illustrating a method of controlling clutches to effectuate a shift such as the shift illustrated in FIGS. 2 and 3.

The downshift is initiated in phase 1A by gradually reducing the commanded torque capacity of brake 68 (OFG1) as shown at 84. When the torque capacity becomes less than the capacity required to maintain 10th gear, the clutch will begin to slip and input speed will begin to rise. As shown by line 62 in FIG. 3, the output torque drops during this phase as power is diverted to increasing engine speed. If the torque capacity of brake 68 is close to zero, then very little of the engine power will be transmitted to the output but the engine speed will increase rapidly. On the other hand, if the torque capacity of brake 68 is maintained close to the level that brake 68 would transmit in 10th gear, then most of the engine power will be transmitted to the output shaft and engine speed will increase slowly. In phase 1B, output torque is maintained at a relatively constant level and input shaft speed increases at a relatively constant rate. As the input shaft increases in speed, the speed difference across clutch 70 (ONC1) and brake 66 (ONC2) decrease. During phases 1A and 1B, the pressure supplied to clutches 70 and 66 may be increased in order to prepare for later engagement, but not enough that to exert substantial torque.

When the speed difference across clutch 70 (ONC1) reverses direction at 88, phase 1B ends and phase 2 begins. At the transition into phase 2, the torque capacity of brake 68 (OFG1) is ramped to zero and the torque capacity of clutch 70 (ONC1) is increased. The torque capacity of clutch 70 (ONC1) is selected such that the output torque and the rate of change of the input speed at the beginning of phase 2 are equal to their values at the end of phase 1B. The method of selecting the torque capacity of clutch 70 (ONC1) is discussed below. As the torque is transferred to this new power flow path, the torque on clutch 76 (OFG2) decreases to zero and would reverse direction if clutch 76 retains torque capacity. However, the torque capacity is rapidly released just as the torque would change direction at 92.

During phase 2, the torque capacity of clutch 70 (ONC1) is gradually increased reducing the rate of increase of input shaft speed and increasing the output torque. The reaction torque during phase 2 is provided by the inertia of the transmission components themselves. For the shift from 10th gear to 6th gear in the arrangement of FIG. 1, clutches 72, 74, and 76, as well as carriers 22 and 42, rotate with ring gear 58. Since these components have relatively high inertia, they provide an effective reaction element. During phase 2, the speed difference across clutch 70 (ONC1) remains negative and the speed difference across brake 66 (ONC2) decreases toward zero. Using methods discussed below, the torque capacity of clutch 70 (ONC1) is controlled such that the speed difference across clutch 70 (ONC1) and brake 66 (ONC2) reach zero simultaneously at the end of phase 2. As these speed differences approach zero, the torque capacity of clutch 70 (ONC1) and brake 66 (ONC2) is rapidly increased at 100.

A shift as illustrated in FIGS. 2 and 3 may be accomplished using the steps illustrated in FIG. 4. As mentioned above, the torque capacity of brake 68 (OFG1) at the end of phase 1B and the torque capacity of clutch 70 (ONC1) at the beginning of phase 32 are selected to ensure that the input shaft acceleration and the output shaft torque are continuous. The torque capacities that produce this result are calculated at step 82.

The speed and torque relationships of a planetary transmission are governed by a number of equations. The speeds of a sun gear ($\omega_{sun}$), carrier ($\omega_{carrier}$), and ring gear ($\omega_{ring}$) are related by the equation:

$$N_{sun}*\omega_{sun}+N_{ring}*\omega_{ring}=(N_{sun}+N_{ring})*\omega_{carrier} \qquad (1)$$

where $N_{sun}$ and $N_{ring}$ are the number of teeth on the sun gear and ring gear, respectively. An element speed is positive if the element rotates in the same direction as the engine and negative if it rotates in the opposite direction. The corresponding angular accelerations are related by the equation:

$$N_{sun}*\alpha_{sun}+N_{ring}*\alpha_{ring}=(N_{sun}+N_{ring})*\alpha_{carrier}. \qquad (2)$$

The torques exerted by each planetary element are related by the equations:

$$N_{sun}*T_{ring}=N_{ring}*T_{sun} \text{ and} \qquad (3)$$

$$T_{sun}+T_{carrier}+T_{ring}=0. \qquad (4)$$

An element torque is positive if it acts to increase the speed of connected elements and negative if it acts to decrease their speed. For any collection of planetary elements that are connected by fixed connections or by fully engaged shift elements, the speeds and accelerations are equal to one another and the accelerations are related to the torques by the equation:

$$J*\alpha=\Sigma(T_i) \qquad (5)$$

where J is the total rotational inertia of the connected elements. The acceleration of the input shaft is dictated by the inertia at the input and the sum of torque exerted by the gearbox and the torque exerted by the prime mover ($T_{in}$). Finally, the torque exerted by a slipping shift element is equal to the torque capacity of the shift element and always acts to increase the speed of the slower element and decrease the speed of the faster element. For any kinematic arrangement and state of fully engaged shift elements, these equations can be solved simultaneously to predict the acceleration of each element and the torque exerted on the output shaft in terms of the torque capacity of each slipping clutch.

During phase 1A and 1B, the output torque ($T_{os\_1}$) and input acceleration ($\alpha_{is\_1}$) are governed by equations of the form:

$$T_{os\_1} = k_1 * T_{in} + k_2 * T_{ofg1} \text{ and} \quad (6)$$

$$\alpha_{is\_1} = k_3 * T_{in} + k_4 * T_{ofg1} \quad (7)$$

where $T_{ofg1}$ is the torque capacity of the first offgoing shift element and $k_1$-$k_4$ are constants based on the inertias of the elements and the numbers of teeth of various transmission gears. Similarly, the output torque and input acceleration during phase 2 are governed by equations of the form:

$$T_{os\_2} = k_5 * T_{in} + k_6 * T_{onc1} \text{ and} \quad (8)$$

$$\alpha_{is\_2} = k_7 * T_{in} + k_8 * T_{onc1}. \quad (9)$$

Setting $T_{os\_1}$ equal to $T_{os\_2}$ and setting $\alpha_{is\_1}$ equal to $\alpha_{is\_2}$ results in two equations relating $T_{in}$, $T_{ofg1}$, and $T_{onc1}$. At step 82, the controller uses these two equations and the current estimate of $T_{in}$ to solve for $T_{ofg1\_1B}$ and $T_{onc1\_2A}$ where $T_{ofg1\_1B}$ is the nominal torque capacity of the first offgoing shift element during phase 1B and $T_{onc1\_2A}$ is the torque capacity of the first oncoming shift element at the beginning of phase 2. Although FIG. 4 shows this calculation occurring only once, some embodiments may repeat the calculation at regular intervals during phases 1A and 1B in order to improve robustness to changes in input torque over the course of the shift event.

In an alternative embodiment, instead of reducing the torque capacity of the first offgoing shift element to zero at the beginning of phase 2, the torque capacity is reduced to a value between zero and $T_{ofg1\_1B}$. In this alternative embodiment, the output torque and input acceleration during phase 2 are governed by equations of the form:

$$T_{os\_2} = k_5 * T_{in} + k_6 * T_{onc1} + k_9 * T_{ofg1} \text{ and} \quad (8a)$$

$$\alpha_{is\_2} = k_7 * T_{in} + k_8 * T_{onc1} + k_{10} * T_{ofg1}. \quad (9a)$$

Setting $T_{os\_1}$ equal to $T_{os\_2}$ and setting $\alpha_{is\_1}$ equal to $\alpha_{is\_2}$ using these revised equations results in two equations relating $T_{in}$, $T_{ofg1\_1B}$, $T_{ofg1\_2A}$, and $T_{onc1\_2A}$ where $T_{ofg1\_2A}$ is the torque capacity of the offgoing shift element at the beginning of phase 2. The controller uses these two equations, the current estimate of $T_{in}$, and the selected value of $T_{ofg1\_2A}$ to solve for $T_{ofg1-1B}$ and $T_{onc1\_2A}$. In this alternative embodiment, output torque during the shift is higher than in the original embodiment, but the shift takes longer because the input shaft acceleration is decreased.

In practice, the actual input shaft torque may differ slightly from the estimate used by the controller for the above calculations and the actual shift element torque capacity may not respond exactly to the commanded levels. Closed loop control strategies improve robustness to these noise factors. Some quantity that is impacted by these noises is measured as the shift progresses. The measured value is compared to a target value which is computed as a function of some measure of shift progress. A correction term for one of the commanded torque capacities is computed at regular time intervals and added to the corresponding previously calculated commanded torque capacity. The correction term may sometimes be called a feedback term and the pre-calculated value may sometimes be called a feed-forward term. During phases 1A and 1B, closed loop control is used for the torque capacity of the first offgoing shift element based on a comparison of anticipated input shaft acceleration to measured input shaft acceleration as shown at 86.

At 94, the controller calculates a target torque capacity of the first oncoming shift element as a function of time that will result in the speed ratio across the first oncoming shift element ($\omega_{onc1}$) and the second oncoming shift element ($\omega_{onc1}$) reaching zero at the same time. During phase 2, the rates of change of these speed differences are governed by equations of the form:

$$\alpha_{onc1} = k_{11} * T_{in} + k_{12} * T_{onc1} \text{ and} \quad (10)$$

$$\alpha_{onc2} = k_{13} * T_{in} + k_{14} * T_{onc1}. \quad (11)$$

If the torque capacity of the first oncoming clutch is constant then the time required for the speed to become zero would be:

$$t_2 = \omega_{onc1\_2A} / \alpha_{onc1} = \omega_{onc2\_2A} / \alpha_{onc2} \quad (12)$$

where $\omega_{onc1\_2A}$ and $\omega_{onc2\_2A}$ are the speed differences of the first and second oncoming shift elements, respectively, at the beginning of phase 2. Substituting equations (10) and (11) into equation (12) and solving for $T_{onc1}$ yields the desired average torque capacity during phase 2, $T_{onc1\_2ave}$. The system is linear, so a torque capacity profile that ramps from $T_{onc1\_2A}$ to $T_{onc1\_2B}$ over a time period of $t_2$ will produce the desired result as long as:

$$T_{onc1\_2A} + T_{onc1\_2B} = 2 * T_{onc1\_2ave}. \quad (13)$$

This torque capacity profile is used as the open loop term for controlling the first oncoming shift element during phase 2. As discussed above, robustness is improved by adding a closed loop term based on a measured feedback value. At step 96, the first oncoming shift element is controlled in closed loop based on a measured $\omega_{is}$. Time from the beginning of phase 2 is used as the measure of shift progress. The target $\omega_{is}$ is determined as a function of time at step 94. In an alternative embodiment, a different measure of shift progress, such as a measurement of $\omega_{onc2}$, could be utilized. Similarly, a different feedback signal, such as a measurement of $\omega_{onc1}$, could be utilized.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of operating a transmission having first, second, third, and fourth shift elements, the method comprising:

initiating a downshift from a first transmission speed ratio in which the first and second shift elements are engaged and the third and fourth shift elements are disengaged to a second transmission speed ratio in which the first and second shift elements are disengaged and the third and fourth shift elements are engaged;

during a first phase of the downshift, controlling an input shaft speed by modulating a torque capacity of the first shift element; and during a subsequent second phase of the downshift, which begins when a relative rotation across the third shift element changes direction, controlling the input shaft speed by modulating a torque capacity of the third shift element.

2. The method of claim 1 wherein the second shift element selectively couples a first component to a second component;

during the first phase of the downshift, the second shift element exerts a negative torque on the first component and exerts a positive torque on the second shift element; and during the second phase of the downshift, the second component rotates faster than the first component.

3. The method of claim 2 further comprising:

reducing the torque capacity of the second shift element to zero while it is exerting positive torque on the second component.

4. The method of claim 3 wherein the torque capacity of the second shift element is reduced to zero during the second phase.

5. The method of claim 1 further comprising:

during the second phase of the downshift, reducing a torque capacity of the first shift element to zero.

6. The method of claim 1 wherein the input shaft speed is controlled such that a relative rotation across the fourth shift element and a relative rotation across the third shift element become zero at the approximately the same time.

7. The method of claim 6 further comprising:

when the relative rotation across the fourth shift element reaches zero, increasing a torque capacity of the fourth shift element.

8. The method of claim 1 further comprising:

controlling the torque capacity of the first shift element the torque capacity of the third shift element such that an output torque at the end of the first phase is approximately equal to an output torque at the beginning of the second phase.

9. The method of claim 8 wherein an input shaft acceleration at the end of the first phase is approximately equal to an input shaft acceleration at the beginning of the second phase.

10. The method of claim 1 further comprising:

maintaining a fifth shift element and a sixth shift element in a fully engaged state throughout the first phase and the second phase.

11. A method of downshifting a transmission from an initial transmission speed ratio to a final transmission speed ratio, the method comprising:

controlling an input shaft speed by modulating a torque capacity of a first oncoming shift element while a current transmission speed ratio is between the initial transmission speed ratio and the final transmission speed ratio wherein a positive output shaft torque is maintained throughout the shift event.

12. The method of claim 11 further comprising:

adjusting the torque capacity of the first oncoming shift element based on a measurement of a speed of a transmission element.

13. The method of claim 12 wherein the transmission element is the input shaft.

14. The method of claim 11 wherein the torque capacity of the first oncoming shift element is controlled such that a speed difference across a second oncoming shift element reaches zero as the current transmission speed ratio reaches the final transmission speed ratio.

15. The method of claim 11 wherein controlling the input shaft speed by modulating the torque capacity of the first oncoming shift element occurs after at least partially releasing a first offgoing shift element and fully releasing a second offgoing shift element and before engaging a second oncoming shift element.

16. The method of claim 15 wherein controlling the input shaft speed by modulating the torque capacity of the first oncoming shift element occurs after fully releasing the first offgoing shift element.

17. The method of claim 15 wherein controlling the input shaft speed by modulating the torque capacity of the first oncoming shift element occurs while maintaining a first holding shift element and a second holding shift element in a fully engaged state.

18. A method of controlling a transmission during a downshift comprising:

releasing two shift elements and engaging a different two shift elements such that an output torque of the transmission is positive throughout the downshift and the output torque dips below an initial output torque only once during the downshift.

19. The method of claim 18 further comprising:

controlling an input shaft speed by modulating a torque capacity of a first of the different two shift elements while a current transmission speed ratio is between an initial transmission speed ratio and a final transmission speed ratio.

20. The method of claim 18 further comprising:

after a relative rotation across a second of the different two shift elements changes direction, controlling the input shaft speed by modulating a torque capacity of the second of the different two shift elements.

* * * * *